Aug. 29, 1950 N. J. STOOKEY 2,520,576
TANK HEATER
Filed Dec. 29, 1947

INVENTOR.
NELSON J. STOOKEY
BY
Flournoy Corey.
ATTORNEY.

Patented Aug. 29, 1950

2,520,576

UNITED STATES PATENT OFFICE 2,520,576

TANK HEATER

Nelson J. Stookey, Central City, Iowa

Application December 29, 1947, Serial No. 794,288

4 Claims. (Cl. 219—41)

This invention relates to water heaters and has particular relation to a heater suitable for heating the water in water tanks and the like.

In northern climates during the winter time, it is very desirable that stock watering tanks and the like be heated when the temperature goes below freezing so that ice will not form on the surface of the water in the tank and stock thereby being prevented from obtaining water.

Various devices have been provided for this purpose, but such devices usually consist of pipes or the like submerged in the tank and usually resting on the bottom of the inside of the tank, which devices are heated by oil or the like. Such devices have the disadvantage that they must be lighted almost every night during winter weather since they are manually controlled and it is difficult to prophesy whether below-freezing temperatures will be reached. Further, such devices are expensive to construct and maintain and use considerable fuel.

It is one of the main objects of my invention to avoid these difficulties of the prior art and to provide a device which can be very readily installed and which will operate only when the surface of the watering tank or the like actually begins to freeze or reaches a temperature at which freezing will take place.

Another object of my invention is to provide a simple, durable, adjustable, automatic heater of this character which will float on the top of the water in the tank or the like so that it can readily be pushed about by the stock and will not interfere with their use of the water.

Another object of my invention is to provide extremely simple and effective ways and structures for sealing such a device and insuring that the electric circuit, wiring and the like of the device will not short circuit through the water or shock stock or persons using such tanks.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims, without departing from the spirit of the invention.

Figure 1:
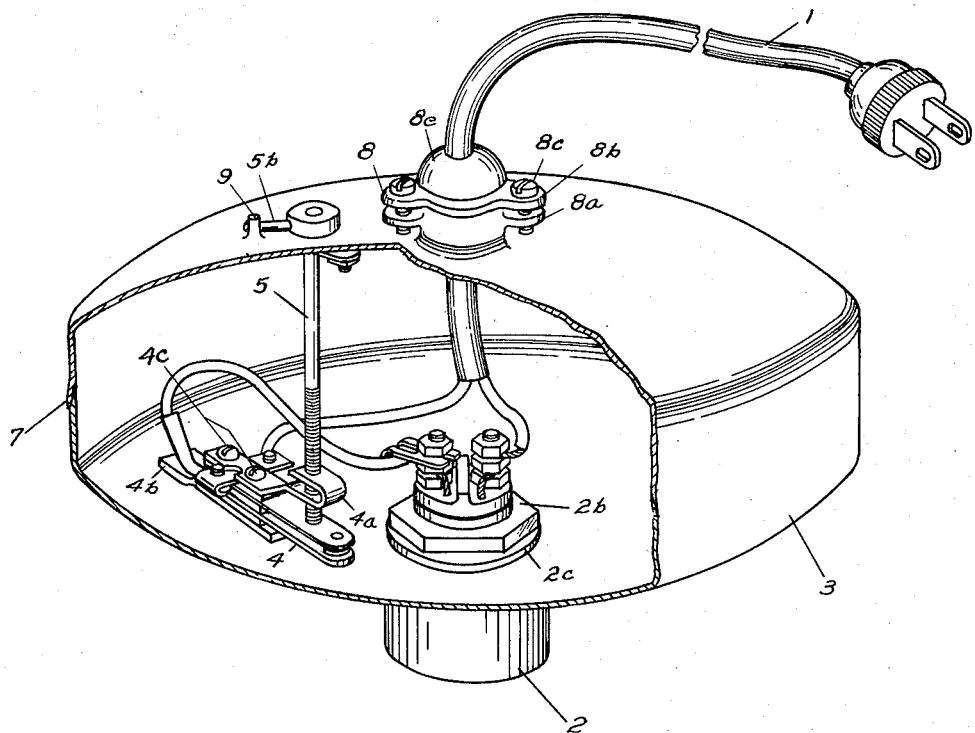
Figure 2:
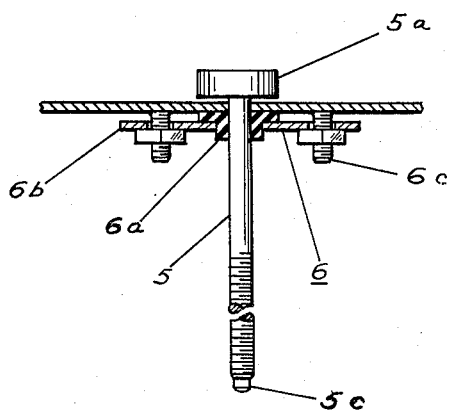

Figure 1 is a view in perspective of a device constructed according to one embodiment of my invention and in which a portion of the tank has been broken away to show the interior structure, and Figure 2 is an elevational view of the adjustment screw shown in the cover or upper half of this device illustrated in Figure 1, and illustrating how this device is sealed with respect to the tank of a heater.

Referring then to the drawings:

A device constructed according to a preferred embodiment of my invention includes a tank member 3, preferably formed in two halves, welded together, as illustrated at 7, around its circumference. I have preferably not only used a cylindrical form such as here shown with the diameter several times the thickness or vertical dimension, but have also provided rounded upper and lower surfaces so that the device may be more easily and readily pushed aside by stock using the tank.

The large diameter compared to thickness materially assists in keeping the device in the upright position here shown while it is floating in the water.

For heating, I preferably utilize an immersion electric heating unit, such as that illustrated at 2, which device is well known in heating practice. This unit is of course water tight and is secured in place in the bottom of the tank 3 by passing a reduced portion of the member 2 through a suitable opening in the lower part of the tank and locking it in place by means of the washer 2c and the nut 2b.

Electric current for energizing this heating element is brought into the heater tank through the conductors, indicated at 1, which pass through a water-tight connection on top of the float which, in a preferred form, consists of an upstruck neck having a pair of outwardly extending, threaded ears 8a. A cap 8 is secured to the upstruck neck by means of the screws 8c which pass through suitable ears 8b in the cap. The cap is preferably domed, as illustrated at 8e, so that packing material may be locked securely within the cap to effectively seal the opening into the float.

A thermostat element, constructed according to a preferred embodiment of my invention, includes a base 4b, a bi-metal strip 4, and a second strip just above this bi-metal strip, the position of which can be adjusted by means of the bolt 5 which extends through the cover of the float. This bolt is threaded at its lower end and has threaded engagement with the double ear 4a of the thermostat so that the friction of the doubleback ear will serve to hold the bolt in any position to which it is rotated. The bolt 5 thus may be adjusted so that the end 5c moves up and down to adjustably position the stationary portion of the thermostat element. I preferably employ a grommet, illustrated at 6, through which the bolt passes, and this grommet has a collar 6a which fits within a cross link 6b. The cross link in turn may be forced against the grommet 6a by means of nuts on the small bolts 6c. The opening through which the bolt leads may therefore be effectively sealed by tightening the nuts on bolts 6c before assembling the device. The bolt 5 is provided with a head 5a and this head preferably has a bar-stop, indicated at 5b, which strikes a projection 9 of the cover of the float so that it cannot be rotated more than one turn.

In connecting the device for operation, one of the wires leading from the cable 1 passes to one binding post of the thermostat 4 and the other wire leads from the other post of the thermostat to one post of the heating element, as shown in Figure 1. The other side of the heating element is then connected by means of a wire which forms the other conductor of the two-wire electric cord indicated at 1.

The thermostatic element is so arranged that on cooling, the bi-metal 4 moves upwardly to cause the contact on the end of this member to make contact with the contact member of the stationary element to thus close a circuit leading to the heating element.

In practice, the adjusting bolt or screw 5 is rotated to a position such that when the temperature of the fluid in which the device is floating reaches a temperature just above freezing, the thermostat will close to cause the heating element 2 to be energized, thus maintaining the surface of the fluid above freezing or at least preventing sufficient dissipation of heat from the liquid to prevent freezing, the heat passing off from the liquid to cooler air being restored by the heat from the heating element so that the freezing process cannot be completed.

Although I have described a specific embodiment of my invention, it is apparent that modifications thereof may be made by those skilled in the art. Such modifications may be made without departing from the spirit and scope of my invention as set forth in the appended claims.

I claim as my invention:

1. In a device of the class described, a water and air-tight tank to the bottom center of which is attached an immersion type electric heating unit, means for closing an electric circuit to the heating unit including a thermostat within the tank having a bi-metal element arranged on cooling of the bi-metal element to cause a contact thereon to engage a stationary contact, means for regulating the position of the stationary element including a screw passing through the cover of the tank, and means for sealing the screw in its passage through the wall of the tank.

2. In a device of the class described, a float consisting of two flattened halves having cooperating flanges, a conductor passing through the upper half, means for sealing the conductor as it passes through the half, an immersion heating unit engaged to the center of the lower half and projecting therebelow, the terminals of the heating unit extending within the float, a thermostat within the float for controllably energizing the heating unit on reaching low temperatures, and means for regulating the thermostat including a screw passing through the upper half of the float and engaging the thermostat.

3. In a device of the characted described, a float comprising two shallow cylindrical halves having cooperating flanged edges, an electrical conductor passing through an opening in the upper half, means for sealing the conductor in the opening, a cylindrical immersion type heater cartridge having terminals at one end thereof extending into the interior of the float through an opening located centrally of the bottom thereof, means sealing said heater in said opening, and a thermostat mounted on an interior wall of said float and connected and arranged to close an electric circuit to the heater cartridge upon a drop in temperature.

4. In a device of the character described, a float comprising two shallow cylindrical, dome-shaped halves having cooperating flanged edges, a cylindrical, immersion type heater cartridge extending downwardly from the center of the lower of said float halves, the upper end of the said heater cartridge having terminals extending upwardly through an opening in the lower float half into the interior of the float, means providing a water tight seal between the heater cartridge and the said lower float half, an electrical conductor passing through an opening in said float, means for sealing said opening, and a thermostat within said float connected with said conductor to close an electric circuit to the heater cartridge.

NELSON J. STOOKEY.

REFERENCES CITED

The following references are of record in the file of this patent:

UNITED STATES PATENTS

| Number | Name | Date |
|---|---|---|
| 2,201,703 | Sage | May 21, 1940 |
| 2,430,272 | Brodie | Nov. 4, 1947 |